United States Patent [19]

Naft

[11] Patent Number: 5,275,094
[45] Date of Patent: Jan. 4, 1994

[54] DIVIDER BASKET FOR STEAM COOKING UTENSIL

[75] Inventor: Stuart Naft, Fairfield, Conn.
[73] Assignee: Black & Decker Inc., Newark, Del.
[21] Appl. No.: 62,094
[22] Filed: May 17, 1993
[51] Int. Cl.⁵ ............................................. A47J 27/04
[52] U.S. Cl. ........................................ 99/416; 99/411;
99/415; 99/418; 99/446; 99/450; 99/448;
126/369; 220/529; 220/912
[58] Field of Search ................ 99/339, 341, 345, 346,
99/410–418, 444–446, 448, 450, 467, 473;
426/510; 126/390, 369; 219/401;
220/23.4, 501, 529, 531, 533, 552, 912

[56] References Cited

U.S. PATENT DOCUMENTS

| | | | |
|---|---|---|---|
| 134,046 | 12/1872 | Gale | 126/369 |
| 508,831 | 11/1893 | Nicholls | 99/411 |
| 866,157 | 9/1907 | McGill | 126/369 |
| 1,290,188 | 1/1919 | Held . | |
| 1,316,827 | 9/1919 | Brunner . | |
| 1,472,205 | 10/1923 | Brunner | 99/416 |
| 1,519,510 | 12/1924 | Santarsiero . | |
| 1,630,787 | 5/1927 | Cullen . | |
| 1,791,889 | 2/1931 | Duncan . | |
| 1,909,983 | 5/1933 | Powell . | |
| 2,459,940 | 1/1949 | Himmel . | |
| 2,467,337 | 4/1949 | Schnell | 99/413 |
| 2,522,152 | 9/1950 | Wilson . | |
| 2,557,613 | 6/1951 | Palensky | 99/413 |
| 2,628,738 | 2/1953 | Hilldale | 99/413 |
| 4,508,027 | 4/1985 | McCord | 99/416 |
| 4,574,776 | 3/1986 | Hidle . | |
| 4,646,628 | 3/1987 | Lederman | 99/413 |
| 4,739,698 | 4/1988 | Allaire | 99/410 |
| 4,817,512 | 4/1989 | Vangen . | |
| 5,097,753 | 3/1992 | Naft . | |
| 5,195,424 | 3/1993 | Guajaca | 99/418 |

FOREIGN PATENT DOCUMENTS

| | | | |
|---|---|---|---|
| 0376907 | 7/1990 | European Pat. Off. | 99/416 |
| 416516 | 10/1910 | France | 99/416 |

Primary Examiner—Timothy F. Simone
Attorney, Agent, or Firm—Barry E. Deutsch

[57] ABSTRACT

A steam cooking utensil includes a base and a boiling liquid reservoir defined by the base. A heater is mounted in the base to heat liquid in the boiling liquid reservoir. A cooking bowl is supported by the base and includes a food support surface having a plurality of vent holes. An adjustable and removable divider basket is mounted in the cooking bowl and includes a food support surface aligned with the food support surface of the cooking bowl. The food support surface of the cooking bowl includes a plurality of vent holes for enabling steam formed in the boiling liquid reservoir to enter into the cooking bowl and into the divider basket. The divider basket comprises first and second sections movably connected to each other for enabling the use to adjust the effective cooking area of the cooking bowl and the divider basket. The divider basket includes handle means for enabling the user to remove the basket from the bowl.

20 Claims, 4 Drawing Sheets

DIVIDER BASKET FOR STEAM COOKING UTENSIL

BACKGROUND OF THE INVENTION

This invention relates to steam cooking utensils and in particular to a divider basket for such utensils which can be used to partition the cooking bowl thereof so that different foods may be steamed simultaneously.

The use of steam cooking utensils has grown in popularity in recent years due to a general health consciousness of the population. Foods cooked in steamers tend to maintain their nutrients.

U.S. Pat. No. 5,097,753 issued on Mar. 24, 1992 in the name of Stuart Naft and is assigned to the same assignee as the assignee hereof. This patent discloses a steam cooking utensil including a cooking bowl having a food support tray. In actual use, the steam cooking utensil disclosed in the cited U.S. Pat. No. can generally only be used to steam one type of food at any given time It has been found that users of the steam cooking utensil sometime desire to simultaneously steam more than one type of food. Additionally, there may be times when in steaming two types of food, one of the types of food should be steamed for a relatively short period of time and the other type of food should be steamed for a relatively long period of time. In such instances, it is desirable that the food that is steamed for a relatively short period of time be easily and readily removable from the steam cooking utensil.

It is accordingly an object of this invention to provide a steam cooking utensil having a removable and adjustable divider basket that can be mounted within the cooking bowl so that two foods of different sizes may be simultaneously steamed.

SUMMARY OF THE INVENTION

The foregoing object and other objects of this invention are attained in a steam cooking utensil comprising a base and a boiling liquid reservoir defined by the base. A heater is mounted in the base to heat liquid in the boiling liquid reservoir. A cooking bowl is supported by the base and includes a food support surface having a plurality of vent holes. An adjustable and removable divider basket is mounted in the cooking bowl and includes a food support surface aligned with the food support surface of the cooking bowl. The food support surface of the cooking bowl includes a plurality of vent holes for enabling steam formed in the boiling liquid reservoir to enter into the cooking bowl and into the divider basket The divider basket comprises first and second sections movably connected to each other for enabling the user to adjust the effective cooking area of the cooking bowl and the divider basket The divider basket includes handle means for enabling the user to remove the basket from the bowl.

DESCRIPTION OF THE PREFERRED EMBODIMENT

Figure 1:
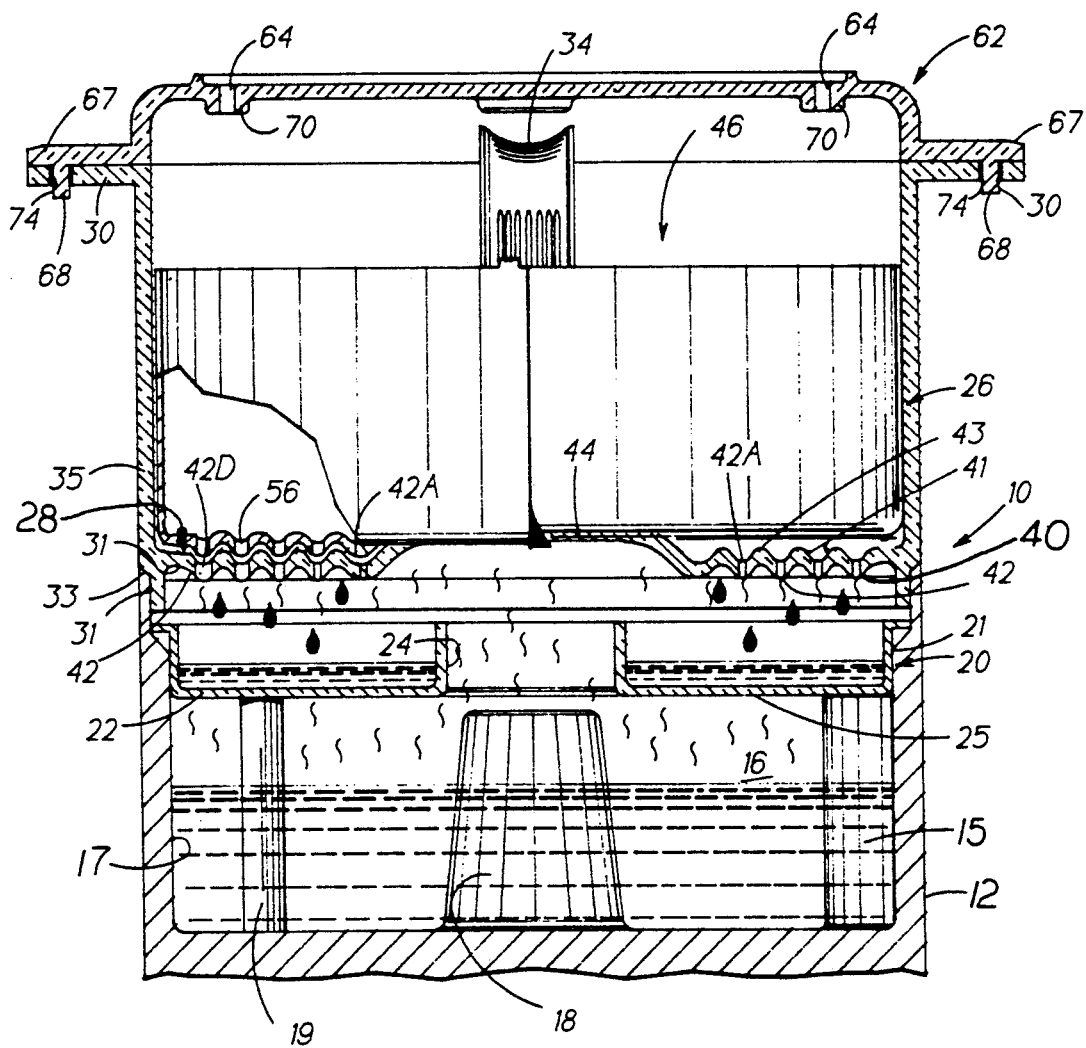
FIG. 1 is an elevational sectional view of a steam cooking utensil including the divider basket of the present invention.

Referring now to the various figures of the drawing, a preferred embodiment of the present invention shall be described in detail. In referring to the several figures of the drawing, like numerals shall refer to like parts.

The present invention is embodied in a steam cooking utensil 10. Utensil 10 includes a base member 12 having a wall 17 defining a boiling liquid reservoir 16. A heating element 18 is mounted in reservoir 16 to provide heat to the liquid, such as water, to transform the water into steam. Preferably, heating element 18 is centrally mounted within reservoir 16. Base 12 may also include an "on/off" switch (not shown) for selectively connecting the utensil to a source of electrical power. Wall 17 includes a pair of annularly spaced support feet 19 (only one of which is shown) and a support pad 15.

Utensil 10 further includes a ring-like member 20 supported by base 12. Member 20 includes an annular outer wall 21 concentrically positioned about and spaced from an annular inner wall 25. Wall 25 difines an opening 24 aligned with heater element 18 The bottom of ring-like member 20 is defined by an imperforate plate 22. Member 20 is supported on pad 15 and feet 19 of base 12.

Utensil 10 also includes a cooking bowl 26 which is also supported by base 12. Bowl 26 includes an axially extending outer wall 35 which defines a food cooking space. The lower end of bowl 26 is closed by food support tray 28. Bowl 26 includes a pair of radially outwardly extending ears 30; each ear includes a slot 74. Bowl 26 further includes an axially extending wall 31 which is radially offset inwardly relative to wall 35 to define a horizontally extending flange-like surface 33. Surface 33 is supported on the top surface of wall 17 of base 12.

Utensil 10 also includes a lid 62. Lid 62 includes a plurality of openings 64 formed in top surface 66 thereof Openings 64 function as steam vents. Lid 62 further includes a pair of radially extending ears 67, each ear having an axially extending finger 68. Fingers 68 conform to the configuration of slots 74 of bowl 26 to join lid 62 snugly to the bowl. Each opening 64 is defined by axially extending wall means 70.

Tray 28 includes an imperforate surface 44 aligned with opening 24 in member 20 and with heater 18 mounted in base 12. A perforated food support surface 43 extends radially outward from imperforate surface 44. Food support surface 43 is defined by a plurality of alternating hill-like ridges 41 and valley-like channels 40 extending radially outward in concentrically spaced rings. Surface 43 also includes a plurality of flow openings or holes 42 for enabling steam generated in the reservoir to flow into cooking space 36. Preferably, as illustrated in FIG. 1, the diameter of flow holes in one concentric ring increase in a radially outward direction relative to imperforate surface 44. Thus, flow holes 42A have the smallest diameter and flow holes 42D have the largest diameter. A more detailed description of steam cooking utensil 10 may be found in the previously cited U.S. Pat. No. 5,097,753.

It has been determined that some users of steam cooking utensil 10 desire to simultaneously steam two foods. It has also been determined that the two foods may have different steaming time periods and further, the two different foods may not be of the same size so that each food will require a different portion of the total capacity of cooking bowl 26.

To enable the user to simultaneously cook two different foods having different steaming time periods, an adjustable divider basket 46 has been provided in steam cooking utensil 10. Divider basket 46 includes a first section 46A and a second section 46B. Section 46A has a food support surface 54 and section 46B has a food support surface 55. Each of the food support surfaces 54, 55 include a plurality of oblong shaped openings 56 extending radially outwardly from imperforate surface 57 to outer wall 32 in concentrically spaced rings The area of each opening 56 in one concentric ring increases in a radially outward direction relative to surface 57.

As illustrated in FIG. 1, openings 56 are vertically aligned with openings 42. This enables steam to flow into divider basket 46 from bowl 26.

Figure 2:
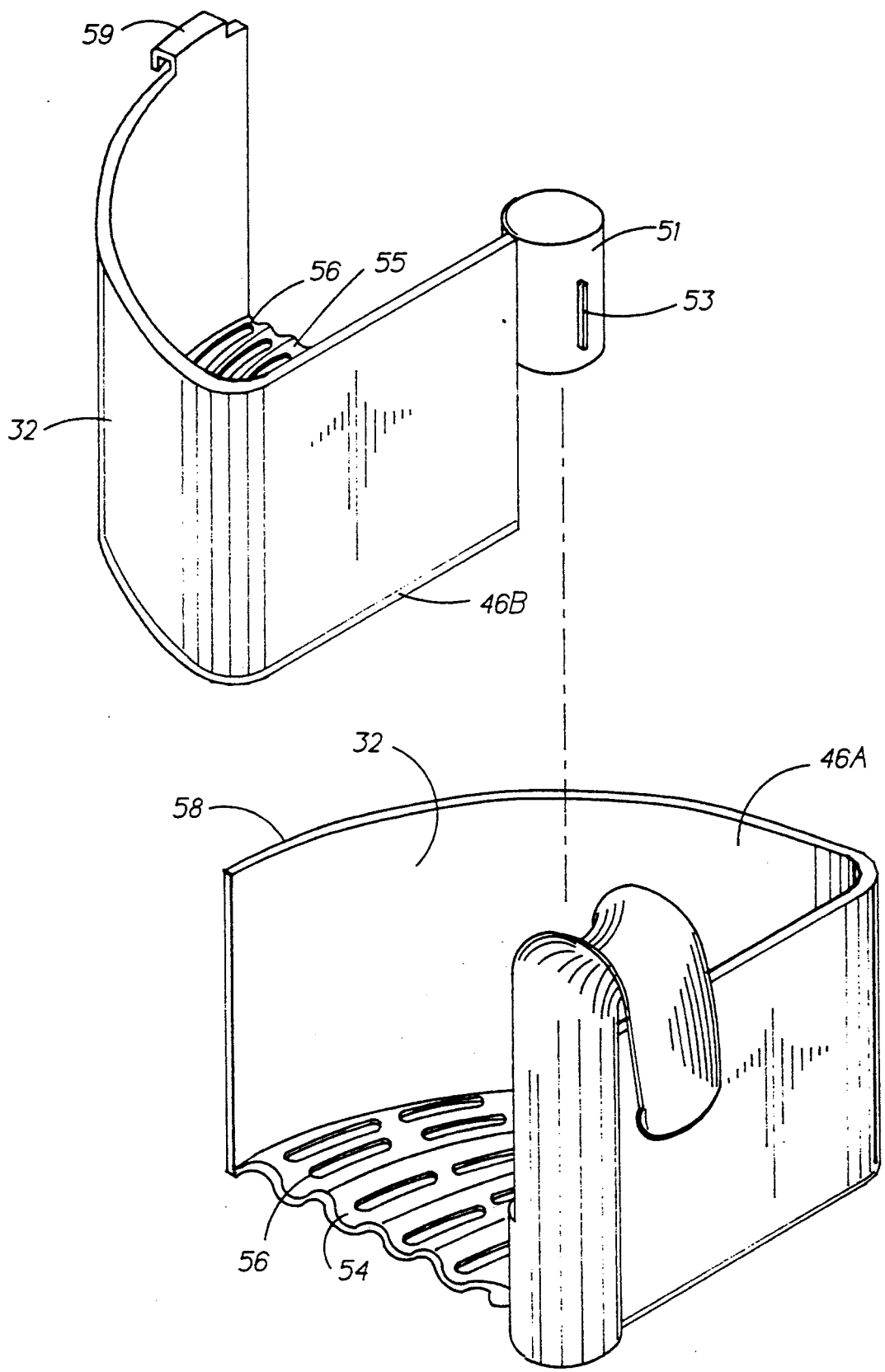
FIG. 2 is an exploded perspective view of the divider basket when viewed from the rear.
Figure 3:
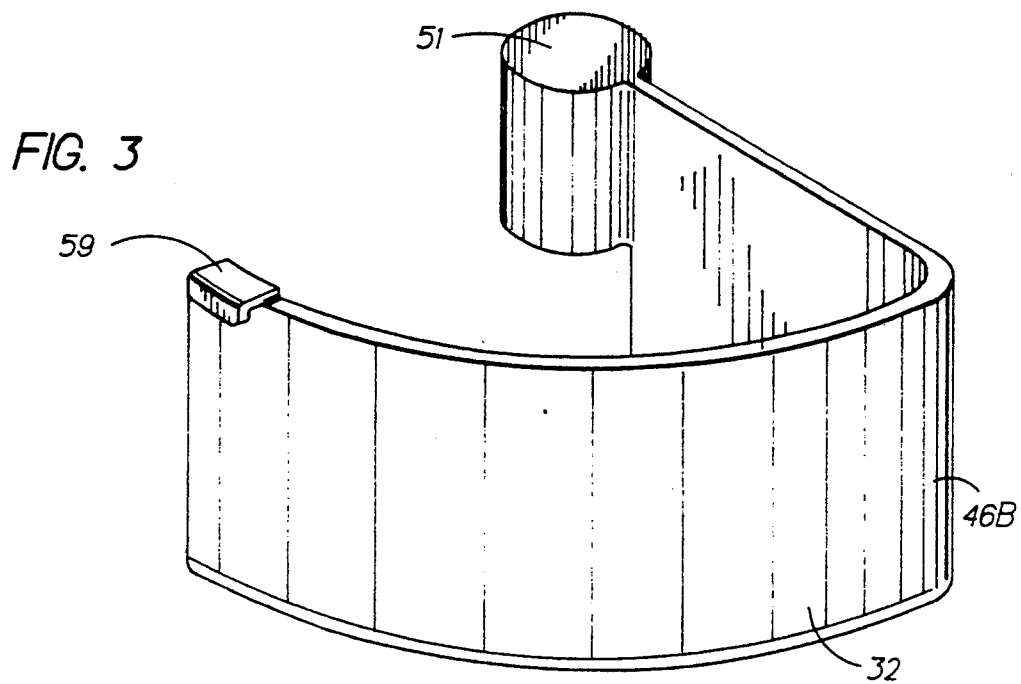
FIG. 3 is an exploded perspective view of one section of the divider basket when taken from the front.
Figure 4:
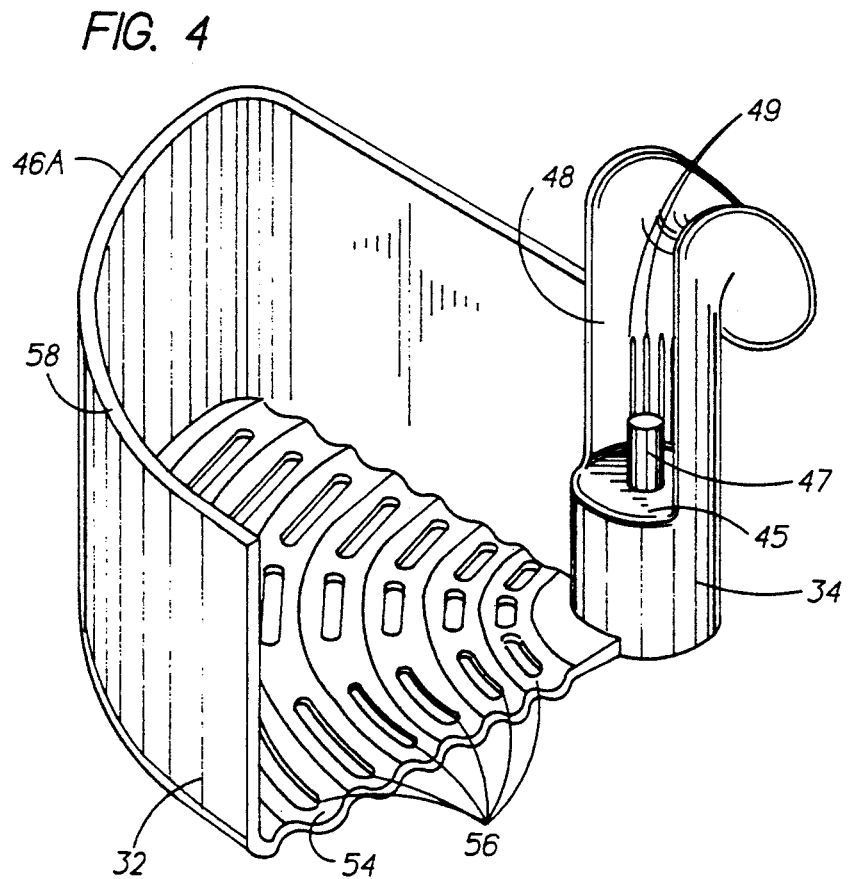
FIG. 4 is an exploded perspective view of a second section of the divider basket taken from the right side thereof.

Each section 46A and 46B includes wall 32 extending vertically upward from an edge of food support surface 54. Wall 32 is arcuate in shape and conforms to the shape of the inner surface of wall 35. Wall 32 defines the periphery of adjustable divider basket 46. As illustrated, wall 32 of each of the sections 46A and 46B extends only about a portion of the periphery of food support surface 54 so that one edge of the surface remains open ended as shown in FIGS. 2-4.

It is desirable that divider basket 46 be adjustable to accommodate foods of different sizes The basket should also be readily removable from cooking bowl 26 by the user. By making basket 46 adjustable, it will accommodate different sizes of food and it will also enable different sizes of food to be effectively cooked within the cooking bowl when the basket is used. In effect, by adjusting basket 46, the effective cooking area of bowl 26 and basket 46 will be simultaneously adjusted.

To obtain the removability feature of basket 46, one of the sections, for example section 46A includes handle means 34. In the preferred embodiment handle means 34 extends upwardly from surface 57. Handle means 34 includes a generally U-shaped surface 48 facing towards support surface 54. Surface 48 includes a plurality of vertically extending horizontally spaced notches 49 for a reason to be more fully explained hereinafter.

Shaft 47 extends upwardly from a horizontal wall 45 of handle 34. Shaft 47 functions as a pivot for pivotally joining sections 46A and 46B.

Section 46B includes a member 51 which has a vertically extending bore for receiving shaft 47. When member 51 is placed over shaft 47 sections 46A and 46B are connected for relative movement.

As shown in FIG. 2, member 51 includes a vertically extending rib 53. Rib 53 is designed to function so that it selectively engages one of the notches 49 formed in surface 48 so that section 46B can be retained in a desired position relative to section 46A to provide the desired effective food steaming area within the walls forming adjustable food basket 46.

Figure 7:
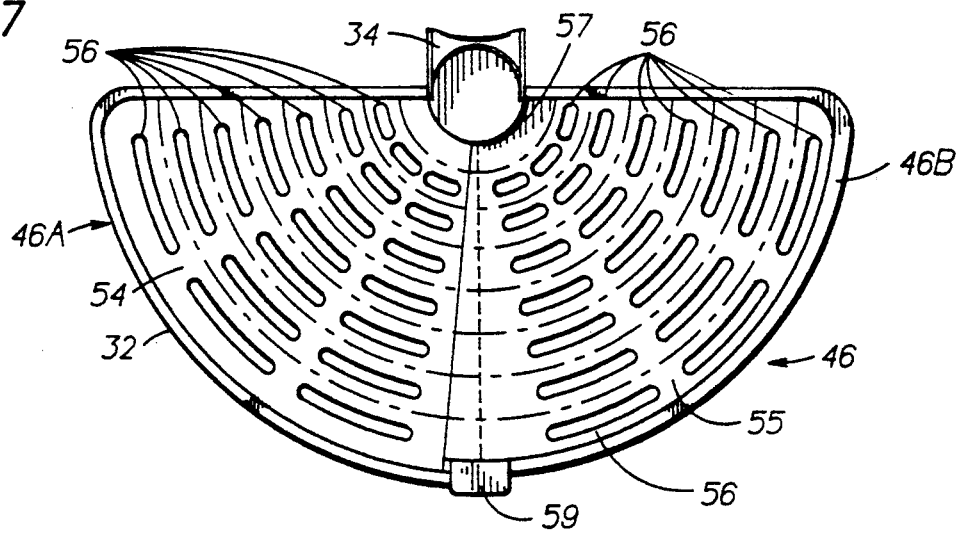
FIG. 7 is a top plan view of the divider basket.

Section 46B also includes food support surface 55 having wall 32 extending vertically therefrom about a portion of the periphery thereof. As wall 32 only extends about a portion of the periphery of support surface 55; support surface 55 includes an open end as shown in FIG. 2. As shown in FIG. 7, when sections 46A and 46B are joined together, the open ends of support surfaces 54 and 55 are in generally abutting relationship so that a continuous food support surface is provided.

One of the sections, for example 46B includes means 59 forming a track. Top surface 58 of wall 32 of section 46A is guided within the track.

Figure 5:
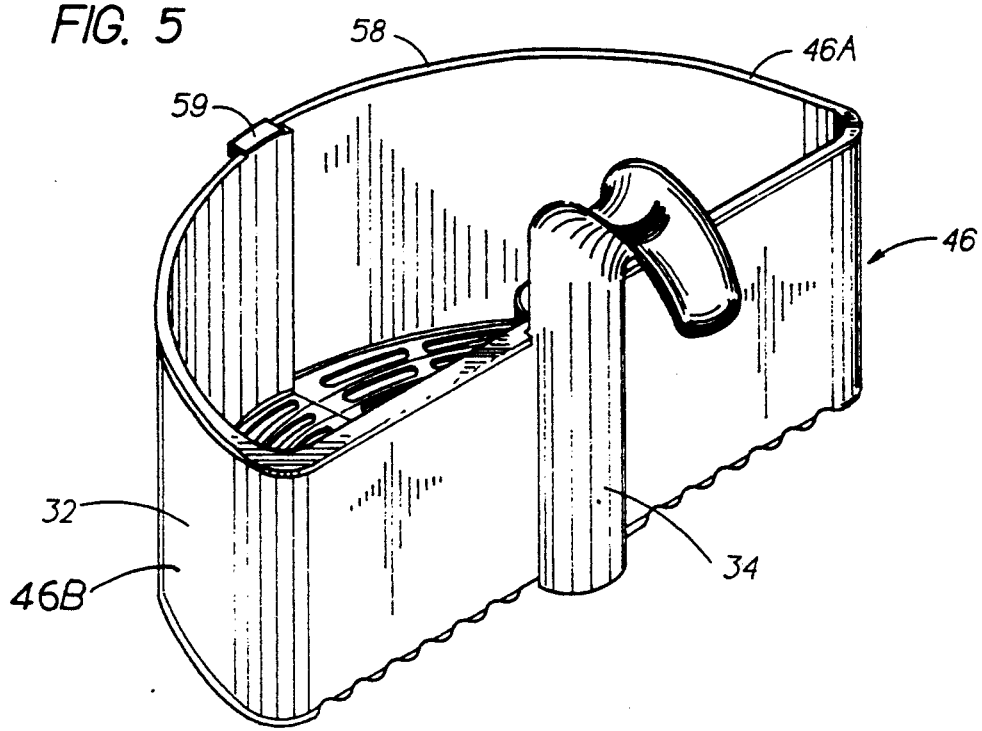
FIG. 5 is an assembled perspective view of the divider basket illustrated in FIGS. 2-4.
Figure 6:
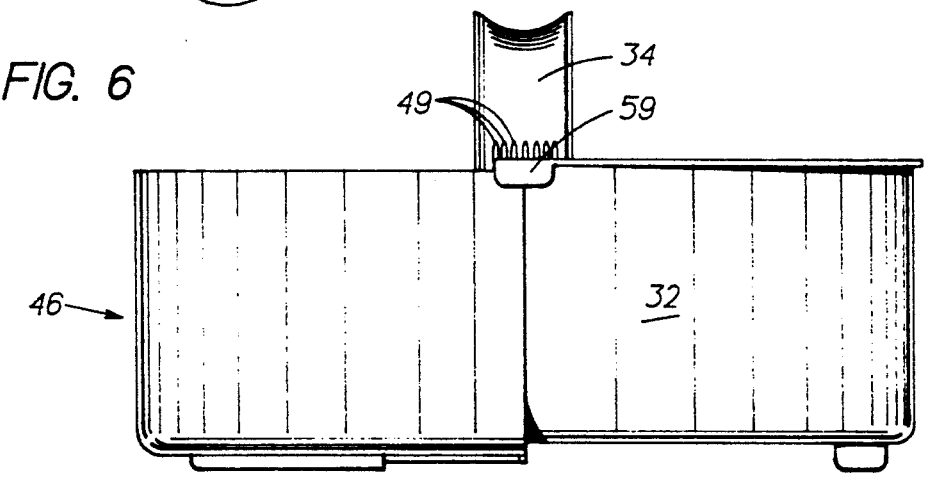
FIG. 6 is a front elevational view of the divider basket.

In using divider basket 46, the user initially adjusts sections 46A and 46B so that the effective area of food support surfaces 54,55 accommodates the size of the food to be steamed within the basket As illustrated in FIGS. 5 and 7, even when section 46B is rotated relative to section 46A so that the effective area of each of the support surfaces 54, 55 are at the maximum, wall 32 of section 46B is in slight overlapping relationship with wall 32 of section 46A and support surface 55 is in overlapping relationship with surface 54. The slight overlapping relationships of the walls and the support surfaces effectively provide a seal to maintain the food within basket 46. If less food is required to be placed within the basket and more food placed in the cooking bowl, section 46A is moved relative to section 46B to reduce the effective area of each of support surfaces 54,55.

If the user has placed food within cooking basket 46 that is steamed in a shorter period of time than the food placed in cooking bowl 26, the user can readily lift divider basket 46 from cooking bowl 26 through the use of handle 34. The detent formed by rib 53 and notches 49 retain sections 46A and 46B of divider basket 46 in position relative to each other.

While a preferred embodiment of the invention has been described and illustrated, the invention should not be limited thereto but may be otherwise embodied within the scope of the following claims:

I claim:
1. A steam cooking utensil comprising:
a base;
a boiling liquid reservoir defined by the base;
a heater mounted in the base to heat liquid contained in the boiling liquid reservoir;
a cooking bowl supported by said base and including a bottom tray defining a first food support surface, said food support surface including a plurality of vent holes for enabling steam generated in said reservoir to flow into said cooking bowl; and
an adjustable and removable divider basket mounted within the cooking bowl and supported thereby comprising a first section and a second section rotatably attached to the first section, said first section including a second food support surface overlying the food support surface of the cooking bowl and wall means extending vertically upward from the food support surface, said wall means extending about a portion of the periphery of said food support surface to provide an open end on said surface, said wall means forming a portion of the outer wall of said basket, said second section including a third food support surface overlying said first food support surface of said cooking bowl, said third food support surface including wall means extending vertically upward about a portion of the periphery thereof to provide an open end on said third support surface, said open end on said third support surface substantially abutting the open end on said second support surface when the first and second sections are in a first food receiv- ing position, pivot means joining said first and second sections of said divider basket for permitting relative movement between said first and second sections to vary the effective area of the second and third food support surfaces, and handle means associated with at least one of said sections for enabling the user to readily remove said divider basket from said cooking bowl.

2. A steam cooking utensil in accordance with claim 1 wherein said means for permitting relative movement between said first and second sections includes vertically extending shaft means extending upwardly above the food support surface of one of the sections and a member having a vertically extending bore attached to the other of said sections for receiving said shaft to pivotally join said first and second sections 3. A steam cooking utensil in accordance with claim 2 wherein at least one of said sections of said divider basket includes handle means for enabling the user to lift said divider basket from said cooking bowl.

4. A steam cooking utensil in accordance with claim 3 including detent means for retaining said first section of said divider basket in a selected position relative to said second section.

5. A steam cooking utensil in accordance with claim 4 wherein said detent means includes a rib extending from an outer surface of said member, said handle means including a generally U-shaped vertically extending surface in which said member is pivotally positioned, the U-shaped surface of said handle means including a plurality of horizontally spaced vertically extending notches, said rib of said member being retained in a selected one of said notches for retaining the first section in a selected pivotal position relative to said second section.

6. A steam cooking utensil in accordance with claim 1 wherein at least one of said sections of said divider basket includes handle means for enabling the user to lift said divider basket from said cooking bowl.

7. A steam cooking utensil in accordance with claim 6 including detent means for retaining said first section of said divider basket in a selected position relative to said second section.

8. A steam cooking utensil in accordance with claim 7 wherein said detent means includes a rib extending from an outer surface of said member, said handle means including a generally U-shaped vertically extending surface in which said member is pivotally positioned, the U-shaped surface of said handle means including a plurality of horizontally spaced vertically extending notches, said rib of said member being retained in a selected one of said notches for retaining the first section in a selected pivotal position relative to said second section.

9. A steam cooking utensil in accordance with claim 1 including detent means for retaining said first section of said divider basket in a selected position relative to said second section.

10. A steam cooking utensil in accordance with claim 9 wherein said detent means includes a rib extending from an outer surface of said member, said handle means including a generally U-shaped vertically extending surface in which said member is pivotally positioned, the U-shaped surface of said handle means including a plurality of horizontally spaced vertically extending notches, said rib of said member being retained in a selected one of said notches for retaining the first section in a selected pivotal position relative to said second section.

11. An adjustable and removable divider basket for a steam cooking utensil comprising:
a first section and a second section rotatably attached to the first section, said first section including a first food support surface and wall means extending vertically upward from the food support surface, said wall means extending about a portion of the periphery of said food support surface to provide an open end on said surface, said wall means forming a portion of the outer wall of said basket, said second section including a second food support surface, said second food support surface including wall means extending vertically upward about a portion of the periphery thereof to provide an open end on said second support surface, said open end on said second support surface substantially abutting the open end on said first support surface when the first and second sections are in a first food receiving position and pivot means joining said first and second sections of said divider basket for permitting relative movement between said first and second sections to vary the effective area of the first and second food support surfaces.

12. An adjustable and removable divider basket in accordance with claim 11 wherein said means for permitting relative movement between said first and second sections includes vertically extending shaft means extending upwardly above the food support surface of one of the sections and a member having a vertically extending bore attached to the other of said sections for receiving said shaft to pivotally join said first and second sections.

13. An adjustable and removable divider basket in accordance with claim 12 wherein at least one of said sections of said divider basket includes handle means for enabling the user to lift said divider basket.

14. An adjustable and removable divider basket in accordance with claim 13 including detent means for retaining said first section of said divider basket in a selected position relative to said second section.

15. An adjustable and removable divider basket in accordance with claim 14 wherein said detent means includes a rib extending from an outer surface of said member, said handle means including a generally U-shaped vertically extending surface in which said member is pivotally positioned, the U-shaped surface of said handle means including a plurality of horizontally spaced, vertically extending notches, said rib of said member being retained in a selected one of said notches for retaining the first section in a selected pivotal position relative to said second section.

16. An adjustable and removable divider basket in accordance with claim 11 wherein at least one of said sections of said divider basket includes handle means for enabling the user to lift said divider basket.

17. An adjustable and removable divider basket in accordance with claim 16 including detent means for retaining said first section of said divider basket in a selected position relative to said second position.

18. An adjustable and removable divider basket in accordance with claim 17 wherein said detent means includes a rib extending from an outer surface of said member, said handle means including a generally U-shaped vertically extending surface in which said member is pivotally positioned, the U-shaped surface of said handle means including a plurality of horizontally spaced, vertically extending notches, said rib of said member being retained in a selected one of said notches for retaining the first section in a selected pivotal position relative to said second section.

19. An adjustable and removable divider basket in accordance with claim 11 wherein at least one of said sections of said divider basket includes handle means for enabling the user to lift said divider basket.

20. An adjustable and removable divider basket in accordance with claim 19 wherein said detent means includes a rib extending from an outer surface of said member, said handle means including a generally U-shaped surface of said handle means including a plurality of horizontally spaced, vertically extending notches, said rib of said member being retained in a selected one of said notches for retaining the first section in a selected pivotal position relative to said second section.

* * * * *